Figure 1A:
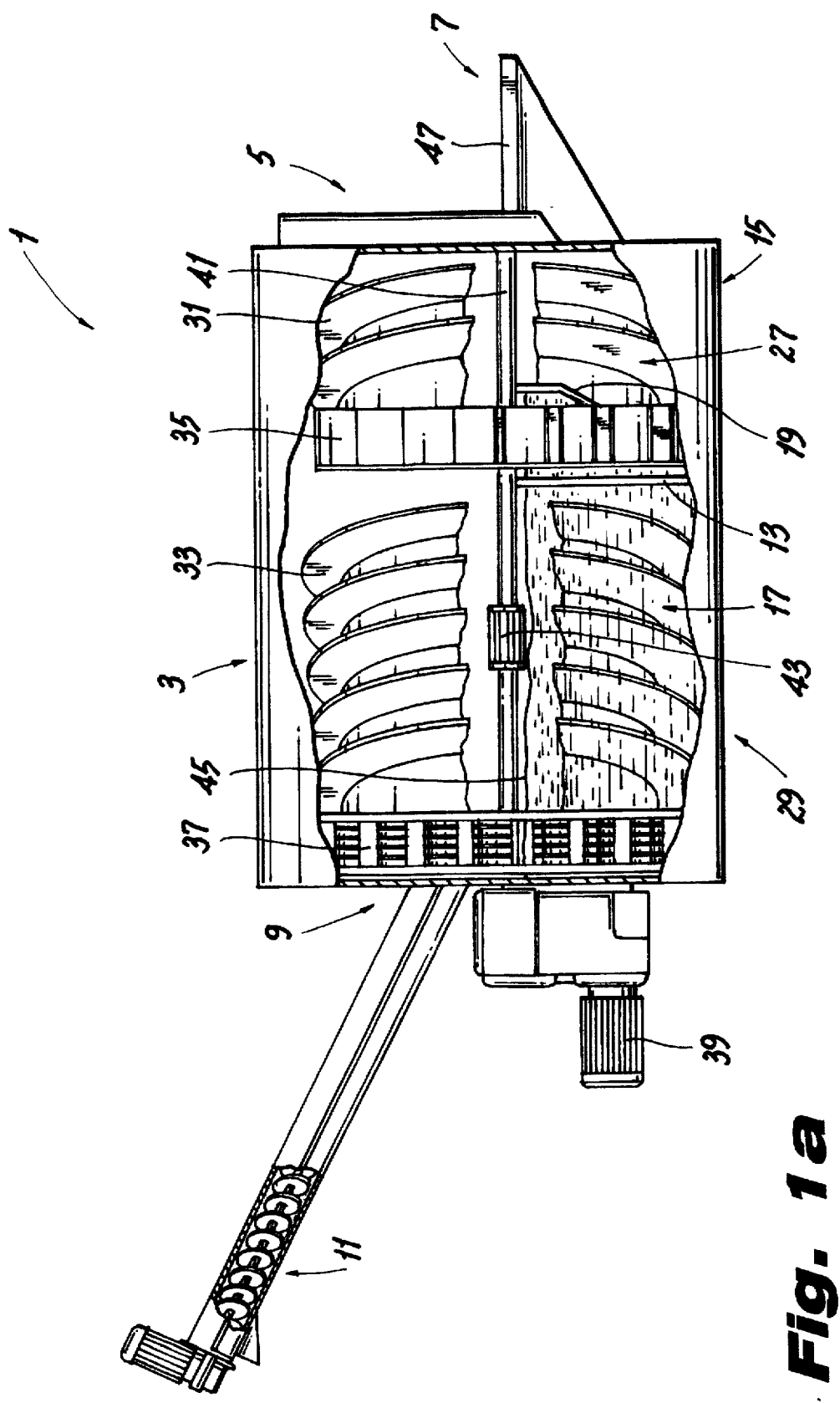

US005778910A

United States Patent [19]

Brenner

[11] Patent Number: 5,778,910
[45] Date of Patent: Jul. 14, 1998

[54] WASHING TROUGH FOR RESIDUAL CONCRETE

[76] Inventor: Horst Brenner, Steinbeisstrasse 2, Beilstein, Germany, 71717

[21] Appl. No.: 731,867

[22] Filed: Oct. 21, 1996

[30] Foreign Application Priority Data

Jan. 16, 1996 [DE] Germany .................. 196 01 262.7

[51] Int. Cl.⁶ ........................................... B08B 3/04
[52] U.S. Cl. .................. 134/65; 134/104.3; 134/132; 134/134; 209/247; 209/273; 209/281
[58] Field of Search .................... 134/65, 104.3, 134/132, 134; 209/3, 235, 247, 261, 268, 273, 281

[56] References Cited

U.S. PATENT DOCUMENTS

| 821,811 | 5/1906 | Maguin | 209/273 X |
|---|---|---|---|
| 2,238,690 | 4/1941 | Fell | 134/65 X |
| 2,505,371 | 4/1950 | Teepe | 134/132 |
| 4,472,272 | 9/1984 | Capannoli | 134/132 X |
| 5,560,495 | 10/1996 | Brenner | 209/273 |

FOREIGN PATENT DOCUMENTS

| 547191 | 9/1922 | France | 134/132 |
|---|---|---|---|
| 1183196 | 10/1985 | U.S.S.R. | 209/281 |

*Primary Examiner*—Philip R. Coe
*Attorney, Agent, or Firm*—Darby & Darby

[57] ABSTRACT

The invention relates to an apparatus for reprocessing residual concrete with a trough (3), conveying equipment (33) with an adjoining bucket wheel (37) and discharging equipment (11). The inventive apparatus is distinguished owing to the fact that the washing-out trough (3) is divided into two mutually separated regions (15, 17), the first region taking up and buffering the residual concrete brought in and the second region functioning as a washing-out trough, and owing to the fact that a further conveying mechanism (31, 35) is provided, which transports material from the first region (15) into the second region (17). Furthermore, the invention relates to a method for reprocessing residual concrete.

15 Claims, 7 Drawing Sheets

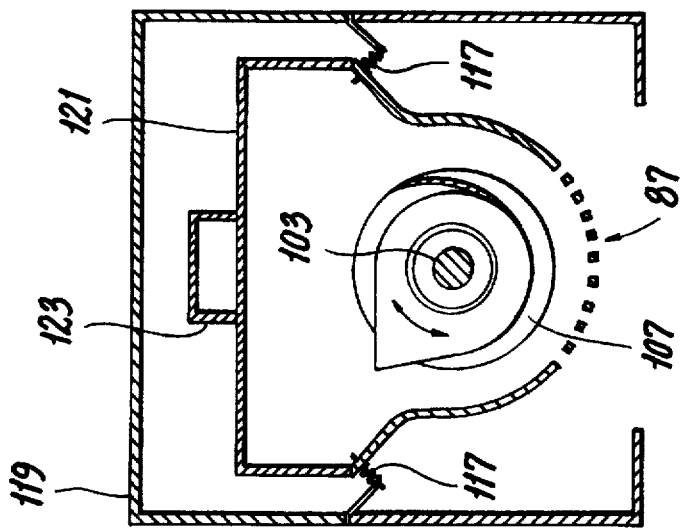
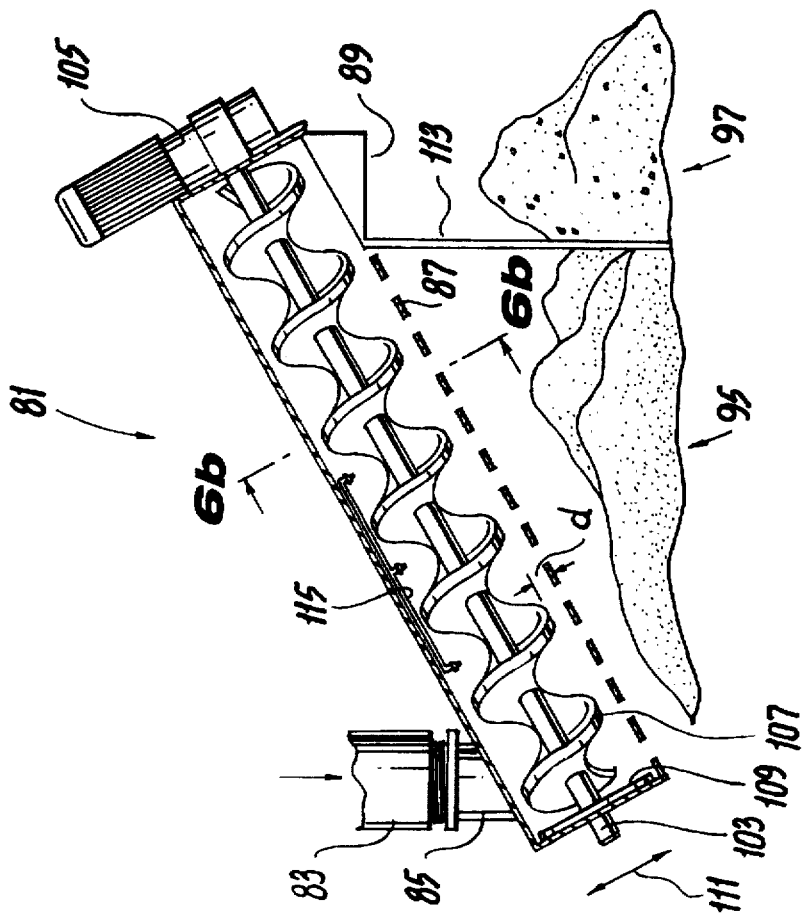
Fig. 6a
Fig. 6b

WASHING TROUGH FOR RESIDUAL CONCRETE

SPECIFICATION

The invention relates to an apparatus for the reprocessing of residual concrete in accordance with the introductory portion of claim 1 and to a method for the reprocessing of residual concrete.

Such an apparatus is also known from the WO 93/13862 of the applicant. The residual concrete is reprocessed there in a washing-out trough, which in its lower cross sectional region has a semicircular trough wall. In its longitudinal direction, the washing-out trough is in each case closed off towards the outside by a transverse partition. At one axial end of the washing-out trough, the residual concrete can be fed in over a filler funnel. At the other axial end of the washing-out trough, conveying equipment adjoins, which discharges the washed-out components of the residual concrete. Further conveying equipment, disposed in the washing-out trough, ensures the transport of the residual concrete, which has been introduced, in the axial direction. For washing out the residual concrete, fresh water reaches the washing-out trough and, after reaching a specified water level, can drain through an opening provided in the washing-out trough.

It is a disadvantage of this equipment that, after large amounts of residual concrete have been transferred to it, for example, from a concrete truck, there is a correspondingly large discharge of water from the washing-out trough. This rapidly discharging water then entrains a large number of fine particles, which are suspended in the upper region of the water bath in the washing-out trough.

Furthermore, in order to prevent an overflow in the charging funnel, the residual concrete must be transported rapidly. This requires a higher conveying speed of the conveying equipment disposed in the washing-out trough and, as a consequence, an increase in the flow rate in the axial direction. As a result, however, the washing-out quality deteriorates.

It is therefore an object of the present invention to provide equipment, which can accommodate a large amount of residual concrete in a small time and nevertheless achieves a high washing-out quality.

This objective is accomplished with the help of the equipment of claim 1 and with the help of the method of claim 15. Owing to the fact that the actual washing-out region is connected in series with a further, partitioned trough region acting as buffer, the introduction of residual concrete into this buffer initially has no effect on the water level in the washing-out region. Conveying equipment, provided in the buffer, transports the residual concrete, which has been introduced, slowly into the washing-out region, the amount transported corresponding to the amount discharged from the washing-out region. During the transport out of the washing-out region, there is furthermore a size-dependent separation of the material, so that, for example, sand and gravel can be separated from one another. However, to support the separation of the material, no further water is added, as it was in the past; instead, the separation takes place dry. This has the great advantage that expensive pipeline systems for supplying and discharging water are not required with the result that the cost of the plant is reduced appreciably. Moreover, the inventive equipment has the advantage that the material, transported out, can be used optimally for producing new concrete, without having to accept a loss in quality. A further advantage is seen therein that, on the one hand, overflowing in the washing-out region is prevented and, on the other, the level of aggregate can be adjusted optimally in the washing-out region, independently of the amount of residual concrete introduced, so that an optimum washing-out quality can be achieved.

Moreover, the flow of water from the washing-out region is decreased, so that a clearly reduced amount of fine particles is entrained with the result of a better separation of the fine particles and appreciably less wear of the pumps in a stirred basin.

Preferably, between the washing-out trough and the trough, with which the washing-out trough is connected in series, a separating partition is provided, the upper edge of which is lower than the upper edge of the charging funnel. With this, overflowing at the charging funnel can be avoided in a simple manner.

In an advantageous further development of the invention, the upper edge of the separating partition is higher than the upper edge of the charging funnel. With this, it can be ensured that material from the buffer cannot overflow into the washing-out region. Rather, it will then overflow the charging funnel, in which case, however, the operator will stop the supply of material.

Further advantageous developments of the invention are given in the remaining dependent claims.

Figure 3:
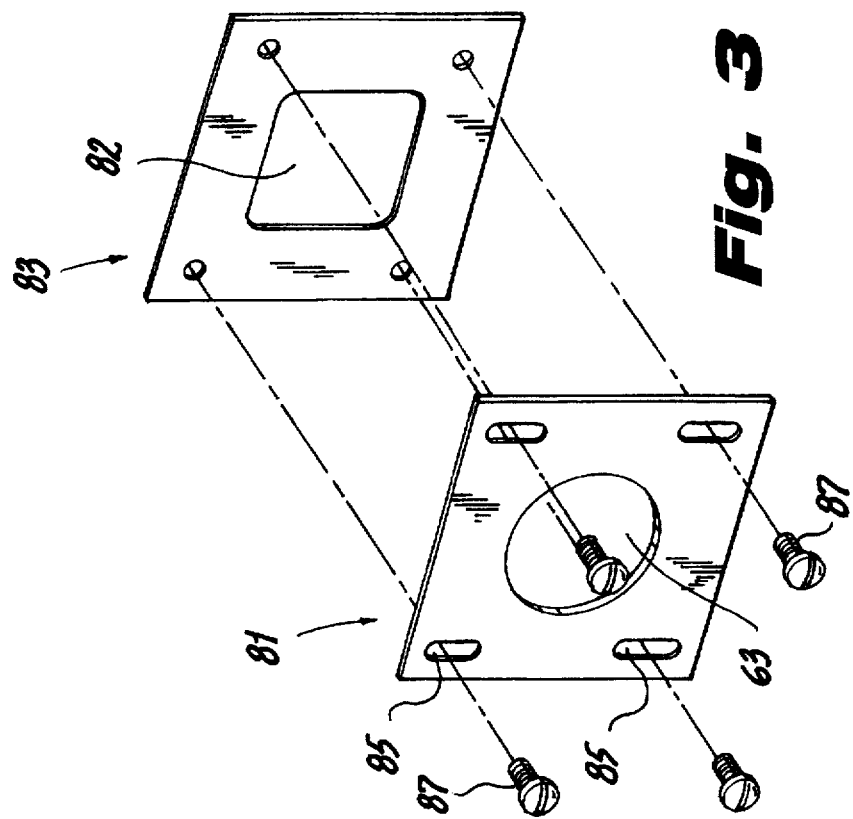
Figure 1B:
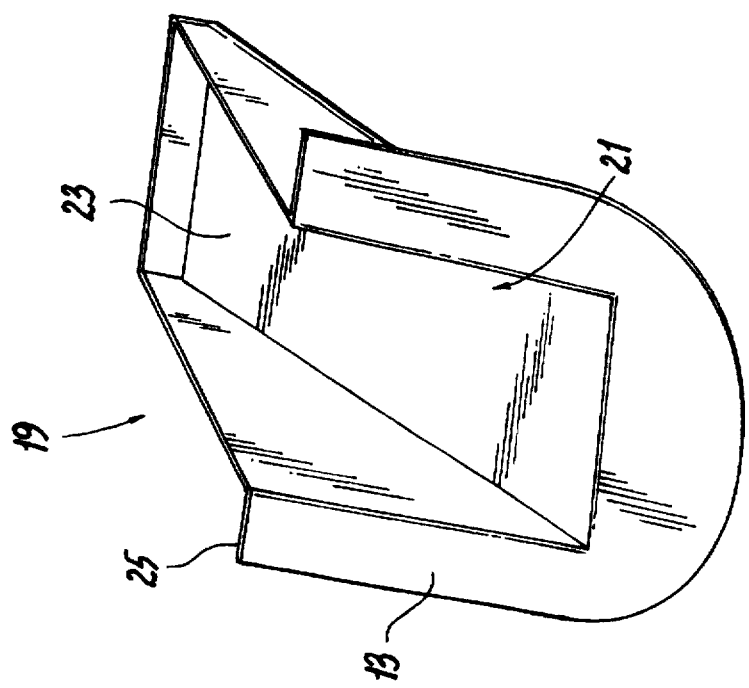
Figure 2:
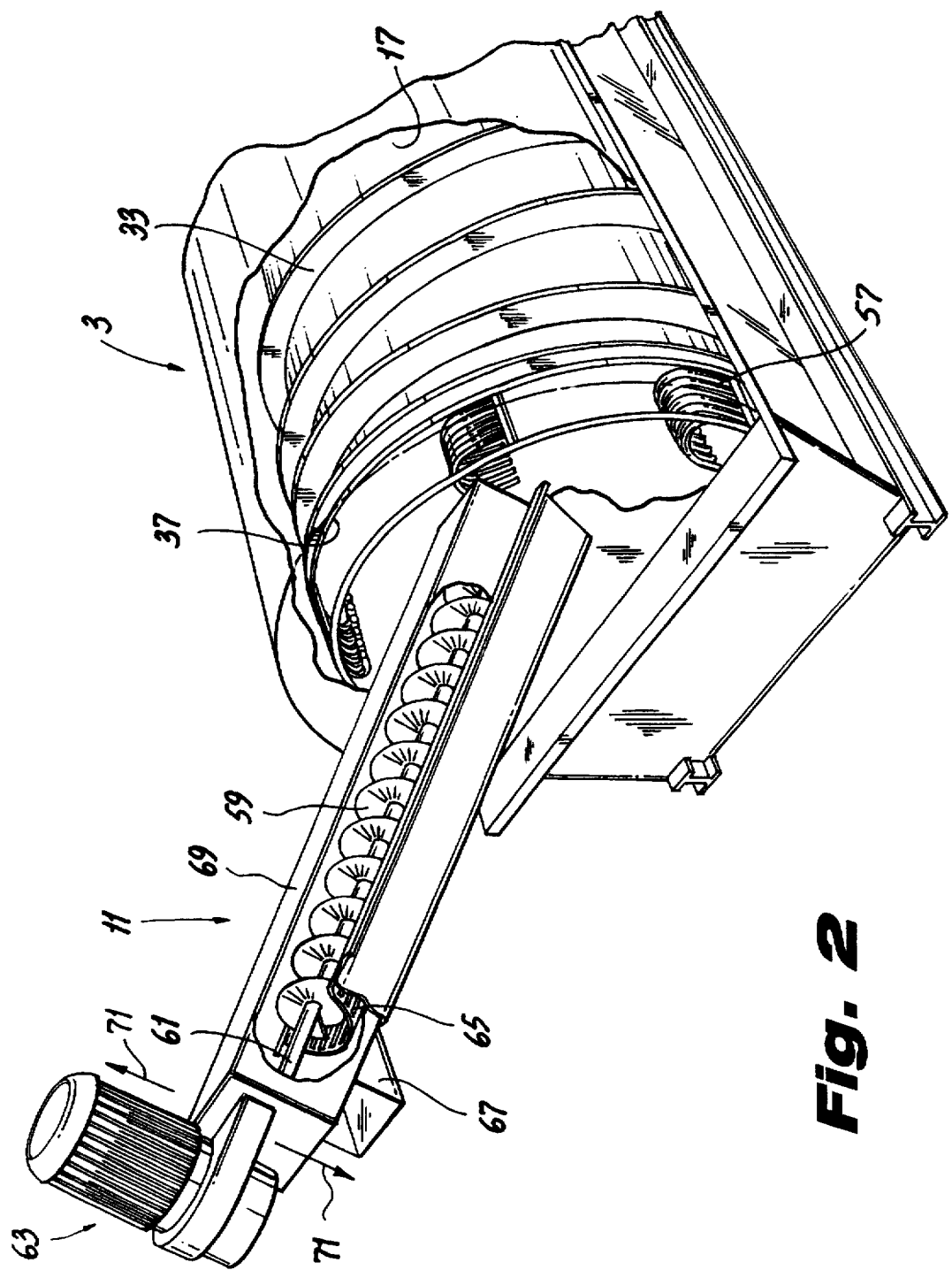
Figure 4:
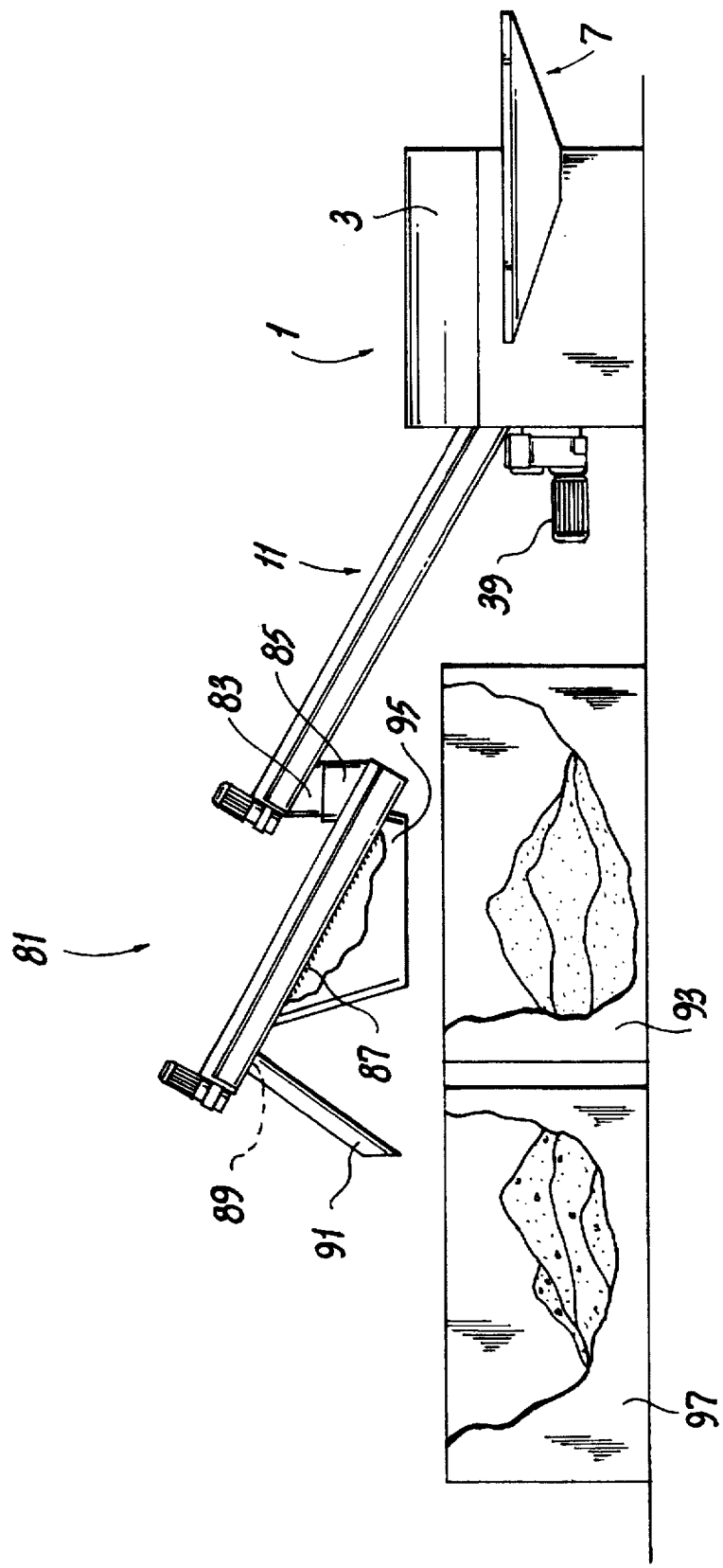
Figure 5:
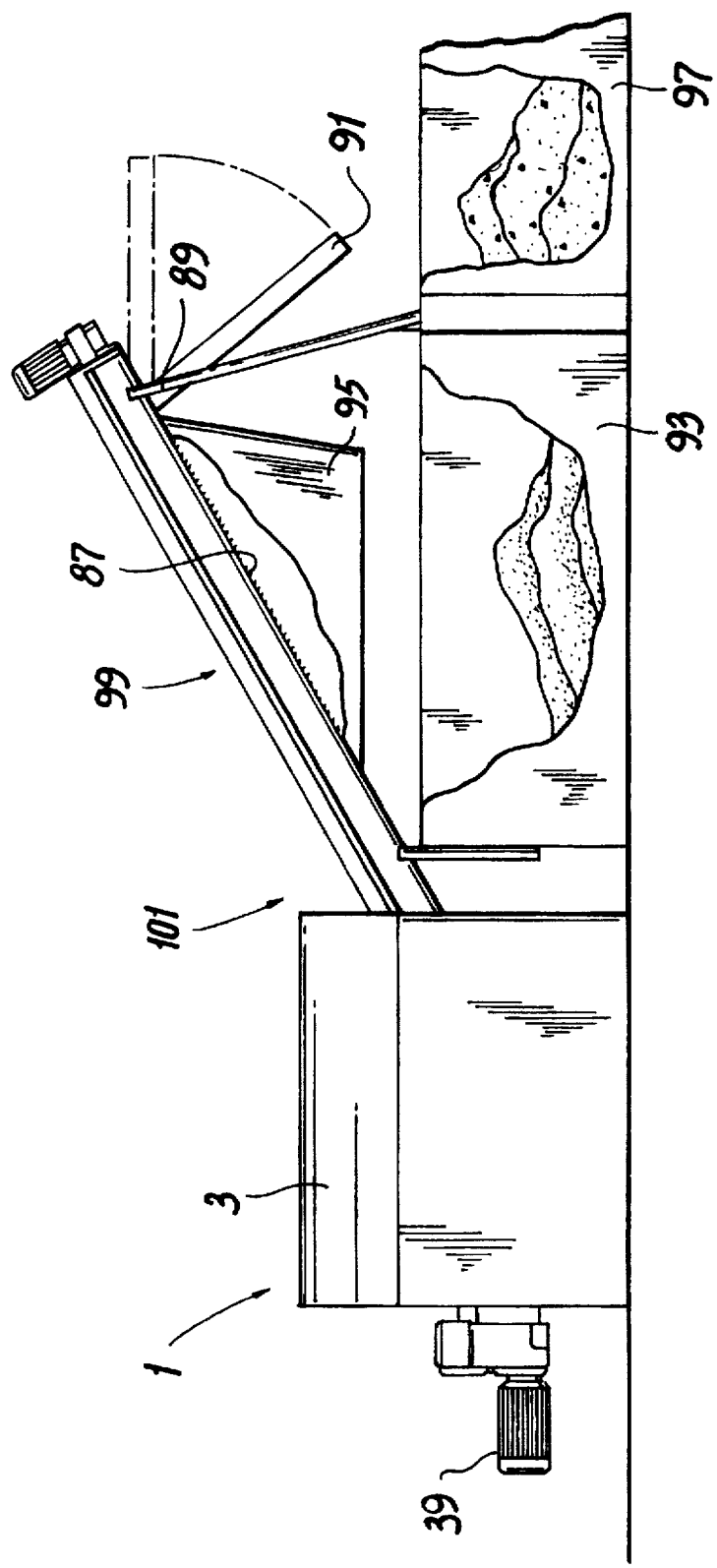
Figure 7B:
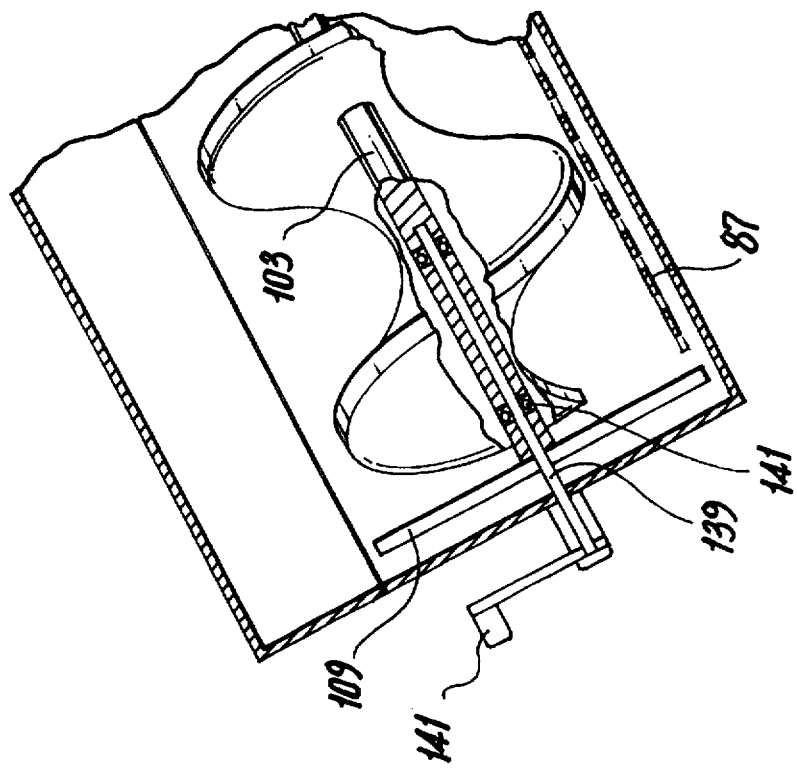
Figure 7A:
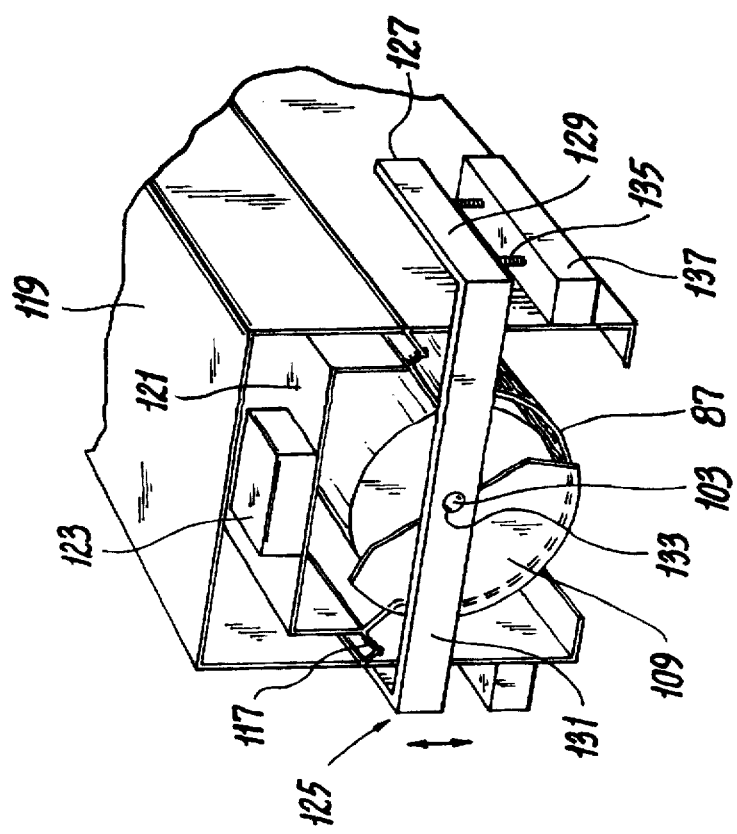

The invention is now described by means of an example with reference to the drawing, in which FIG. 1a is a diagrammatic representation of the inventive apparatus, FIG. 1b is a diagrammatic representation of a transfer chute, FIG. 2 is a diagrammatic representation of the washing-out region, to which discharging equipment is connected, FIG. 3 is a diagrammatic representation of a section of the discharging equipment, FIG. 4 is a diagrammatic representation of a second example of the invention, FIG. 5 is a diagrammatic representation of a further example of the invention, FIG. 6a is a diagrammatic sectional representation of the discharging and screening equipment shown in FIG. 5, FIG. 6b is a sectional representation of the apparatus shown in FIG. 6a, FIG. 7a is a perspective representation of a section of the apparatus shown in FIG. 6a and FIG. 7b is a diagrammatic sectional representation of a part of the apparatus shown in FIG. 6a.

The apparatus for reprocessing residual concrete 1 comprises, according to FIG. 1, an elongated housing 3, which has a bottom that is semi-circular in cross section. A charging funnel 7 is mounted at one end 5 of the housing 3 and discharging equipment 11 at the opposite end 9.

The inner walls of the housing 3 form a trough, which is divided by a separating partition 13 into a first region 15, which is referred to as a buffer, and a second region 17, which is referred to as a washing-out chamber. Moreover, the separating partition is constructed so that it lies tightly against the semi-circular bottom of the housing 3.

Starting out from the separating partition 13, a transfer chute 19, extending upwards at an angle, protrudes into the buffer 15.

It can be seen clearly in FIG. 1b that the separating partition 13 has a recess 21, which is opened up towards the upper edge, the side walls of the transfer chute 19 lying against the edges of the recess 21. A chute surface 23 of the transfer chute 19 extends from the lower edge of the recess 21 at an angle upwards and ends level with the upper edge 25 of the separating partition 13.

FIG. 1a furthermore shows two conveying facilities, which extend in the axial direction, the first conveying facility 27 being disposed in the buffer 15 and the second conveying facility 29 being disposed in the washing-out chamber.

Both conveying facilities 27, 29 in each case comprise a conveying spiral 31 or 33, adjoining which there is in each case a so-called bucket wheel 35 with closed buckets or a bucket wheel 37 with open buckets.

A motor 39, accommodated laterally at the housing 3, drives the two conveying facilities 27, 29 over a drive shaft 41.

Within the washing-out chamber 17, an opening 43 is provided in the side wall of the housing 3 as water outlet into a downstream region. By bringing water into the washing-out chamber 17, a water bath is formed, the level of which is indicated by a wave-shaped line 45. The height of the water level depends directly on the height of the outlet opening 43. The water bath itself extends in the axial direction from the left side (in FIG. 1a) of the housing 3 up to the separating partition 13 or to the transfer chute 19. Owing to the fact that the dimensions of the separating partition 13 are selected so that the upper edge 25 lies above the water level 45, penetration of water into the buffer 15 is prevented. Accordingly, the buffer 15 is free of water, whereas the washing-out chamber 17 contains water.

Moreover, it can be inferred from FIG. 1a, that the upper edge 47 of the charging funnel 7 is higher than the upper edge 25 of the separating partition 13. With this, overflow of the material over the edge 47 of the charging funnel 7, when the buffer 15 is too full, is effectively prevented.

Of course, as has already been mentioned, the upper edge 25 of the separating partition 13 can be higher than the upper edge 47 of the charging funnel 7. This is to be preferred particularly when uncontrolled water and material are to be prevented under any circumstances from reaching the washing-out chamber 17. Rather, by means of this arrangement, the operator is induced to interrupt the supply of material into the buffer 15. Otherwise, the material supplied would overflow into the charging funnel 7. The quality of the washing in the washing-out chamber 17 can be increased with the help of this higher separating partition.

The conveying spiral 33 in the washing-out chamber 17, shown in FIG. 2, extends from the separating partition 13 to the end 9 of the housing. The driving mechanism of the conveying spiral 33 is such that a conveying direction results, which is directed from the transfer chute 19 to the bucket wheel 37. The bucket wheel 37 adjoins the end of the conveying spiral 33 and, contrary to the bucket wheel 35, has open drag buckets 57. This open form is selected in order to transport only solid material above a certain grain size.

The discharging equipment 11 protrudes into the interior of the bucket wheel 37, a funnel-shaped opening collecting the material falling out of the drag buckets.

The material collected is transported by means of a screw conveyor 59, which is driven by a motor 63 over a drive shaft 61.

The lower half of the screw conveyor 59 is embraced by a flexible, trough-shaped plastic track 65, on which the material is transported upwards to a discharging chute 67. The plastic track 65 is fastened laterally to the housing 69 surrounding the screw conveyor 59.

The arrows 71, drawn in FIG. 2, are intended to indicate that the whole unit of motor 63, drive shaft 61 and screw conveyor 59 is disposed so that it can be shifted with respect to the plastic track 65 functioning as conveying trough. Accordingly, the distance between the conveying trough 65 and the screw conveyor 59 can be changed.

As indicated diagrammatically in FIG. 3, the shiftability can be attained, for example, owing to the fact that the motor is mounted on a plate 81, which in turn is fastened with screws 87 to a further plate 83, which is connected with the housing 69 and has a shaft opening 82. With the help of the adjusting screws 87, which are passed through elongated holes 85 formed in the plate 81 and therefore can easily be reached from the outside, the aforementioned unit can then be shifted.

A similar adjusting mechanism, which is not shown in the Figure, can then also be provided in the lower region of the screw conveyor. With the help of this further adjusting mechanism, the screw conveyor can be adjusted so that the distances between the screw conveyor and the conveying trough in the longitudinal direction are variable so that, for example, the distance is less at the beginning and more at the end of the discharging equipment.

The function of the apparatus 1 is described briefly in the following.

The residual concrete, contained, for example in a concrete truck, together with the rinsing water, reaches the charging funnel 7 and, with that, the buffer 15. The capacity of this buffer 15 is selected so that the residual concrete, usually present in a concrete truck, can be accommodated well and that the level does not rise above the upper edge of the separating partition 13. With the help of the conveying spiral 31, the mixture of water and residual concrete reaches the bucket wheel 35 which, with the help of its drag buckets 55, transports the material into the transfer chute 19. From there, the material reaches the washing-out chamber 17, where the residual concrete is washed out by the addition of water. The manner, in which such a washing-out trough functions, is known from the state of the art and is therefore not dealt with in greater detail in the following.

After the material is transported by means of the conveying spiral 33 to the bucket wheel 37, the material of a particular size fraction is transported there by the open drag buckets 57 to the filler funnel of the discharging equipment 11. From there, with the help of the screw conveyor 59 and the discharge chute 67, the material reaches, for example, a storage tank.

FIG. 4 shows a further example of an apparatus for reprocessing residual concrete. In addition to the apparatus already described in relation to FIG. 1a, this example has a sand and gravel separator 81. This sand and gravel separator is constructed as conveying equipment, the basic structure of which corresponds to that of the discharging equipment 11. Material is supplied over the discharging equipment 11, which for this purpose has at its end a preferably tubular discharging opening 83. A charging opening 85 is connected rotatably with the discharging opening 83 and ends in an initial section of the sand and gravel separator 81. With the help of the rotational connection, it is possible to align the separator 81 in various ways.

To separate finer sand fractions from the material supplied, the separator 81 has at its underside a preferably half shell-shaped screen, preferably from an elastomeric cloth with a Shore hardness of 80° to 95°, which extends almost over the whole of the length. With this, the screen forms the bottom of the separator 81, on which the material supplied is transported upwards by the screw conveyor.

At the end of the separator 81, a discharging opening 89 is provided, which ends in a chute 91.

FIG. 4 shows that the separator 81 has no water pipelines, with the help of which water is added to aid the separation. Instead, the process of separation takes place in the dry state.

This equipment functions in the following manner:

As already described with reference to the Figure, material is conveyed upwards from the housing 3 by the discharging equipment 11, no water being supplied. At the end of the discharging equipment, the material falls through the discharging opening 83 into the charging opening 85 and, with that, into the beginning section of the separator 81. The conveying spiral transports the material, which has fallen in, upwards on the perforated bottom 87 also without the addition of water, certain particle size fractions falling from the separator 81 through the screen. In the example, shown in FIG. 4, the sand falls into a box 93. With the help of a funnel 95, mounted at the underside of the separator 81, the area, required for collecting the sand, can be reduced.

At the end of the separator 81, the gravel fractions fall through the outlet opening 89 and by means of the chute 91 into a further box 97, which serves as storage. With the help of the rotatable coupling of the separator 81 to the discharging equipment 11, several adjacent boxes can be charged.

In FIG. 5, a further example of an apparatus for reprocessing residual concrete is shown. In its function, it corresponds to the equipment shown in FIG. 4, so that here also sand is separated from gravel. In contrast to the aforementioned example, however, the discharging equipment 11 and the sand and gravel separator 81 are combined into a common unit 99. In its construction, this discharging and screening equipment 99 corresponds essentially to the sand and gravel separator 81, the only difference being that a longitudinal section 101, adjacent to the housing 3, does not have a screen, so that it functions merely for transport into the adjoining screen section.

As in the previously described example, the sand and gravel fractions are also separated without addition of water during the upwards transport of the material, coming from the housing 3, on the perforated screen 87. The sand, falling through the screen, falls through the funnel 95 into the sand box 93 below. Any material, which has not fallen through the screen because of its size, is passed at the end of the discharging and screening equipment 99 over the pivotably disposed chute 91 into the gravel box 97.

The advantage of this equipment lies particularly therein that a very compactly constructed sand and gravel separator is possible, which furthermore can be produced relatively very inexpensively. In particular, the additional cost of combined discharging and screening equipment is only slightly higher than the cost of discharging equipment 11 of the example of FIG. 1.

It has proven to be particularly advantageous to run the discharging and screening installation 99 in a cycled operation. Better dewatering and screening can be realized by these means than by a continuous operation.

A schematic representation of the sand and gravel separator 81, own in FIG. 4, can be seen in FIG. 6a.

The separator 81 preferably has a hollow shaft 103, which is driven by a motor 105. A spiral 107, which is constructed for transporting material in the direction of the motor 105, is mounted on the shaft 103. The end of the separator 81, opposite to the motor 105, is closed off by a disk 109, which is seated preferably on the shaft 103.

A trough-shaped perforated bottom 87 forms the lower boundary of the separator 81, the size of the screen openings being adapted to the desired size of the sand particles. The individual openings in the screen are disposed more or less closely together in the longitudinal direction depending on the amount that is to be screened. An optimum transport of the material to be screened arises at an angle of up to 37° between the longitudinal axis of the shaft 103 and the horizontal.

To compensate for the radial wear of the spiral 107, the shaft 103, which is marked by an arrow 111, is disposed so that it can be shifted transversely to the transporting direction. With this, a distance d between the perforated bottom and the outer edge of the spiral 107 can be changed.

In the longitudinal direction, the discharging opening 89, which is directed into the gravel box 97, adjoins the perforated bottom 87. In the present case, to separate the sand box 95 from the gravel box 97, a partition 113 is provided, which is disposed at the end of the perforated bottom 87 and proceeds at an angle downwards. Aside from the separating function, the partition also functions as a chute for the sand falling through the screen in the upper longitudinal section.

To improve the screening action, nozzle equipment 115 is provided in the lower longitudinal section of the separator 81 and enables air to be blown in. The nozzle equipment 115 preferably comprises a plurality of nozzles, which are disposed at a distance from one another in the longitudinal direction and are directed towards the perforated bottom 87. When the air flow rate or pressure is adjusted appropriately, it is possible to force the sand, which is being conveyed upwards on the perforated bottom 87, through the perforations out of the separator 81.

In FIG. 6b, a sectional representation of the separator 81 of FIG. 6a is shown. The half shell-shaped or trough-shaped construction of the perforated bottom 87 can be recognized clearly. The bottom 87 is fastened flexibly over springs 117 to a housing 119, which forms the side walls as well as the roof wall above. It is possible to cause the elastically mounted perforated bottom 87 to oscillate horizontally and/ or vertically by means of one or several connecting elements 121, which are disposed at a distance from one another in the longitudinal direction, and shaking equipment. On the one hand, the upwards transport and, on the other, the separation of sand from gravel can be improved with the help of shaking equipment.

With respect to FIG. 6a, it should also be stated that the shaft 10 can be shifted relative to the perforated bottom 87. An appropriate adjusting mechanism 125 is shown in FIG. 7a. It comprises a U-shaped frame part 127, the legs 129 of which run parallel to the respective side wall of the housing 119. The section 131, connecting the two legs 129, has an opening 133, in which the shaft 103 is held and mounted. The legs 129 are in each case connected by means of two adjusting screws 135 to the frame parts 137, which are mounted in each case at the side wall. The distance between a leg 129 and the adjacent frame part 137 can be varied by manipulating the adjusting screw 135 appropriately. On both sides, the shaft 103 and the spiral 107 are shifted relative to the perforated bottom 87.

FIG. 7b shows the way in which the shaft 103 is fastened to the frame section 131. For example, a stationary shaft 139 is supported on several bearing 141 in the hollow shaft 103. The stationary shaft 139 passes through the disk 109 and ends in the opening 133 of the frame part 125. In this way, the lower end of the shaft 103 is connected rotatably with the adjusting mechanism 125.

FIG. 7b furthermore shows additional shaking equipment 141, which is connected with the perforated bottom 87 and supplements the already described shaking equipment 123. It is, for example, conceivable to use the shaking equipment 123 for vertical shaking motions and the shaking equipment 141 for horizontal motions.

Although the embodiments of FIGS. 6a to 7b relate to the sand and gravel separator 81 of FIG. 4, the discharging and screening equipment 99, shown in FIG. 5, can of course also be constructed correspondingly.

I claim:

1. An apparatus for reprocessing residual concrete comprising: a trough, a first conveying mechanism proximal to an adjoining bucket wheel and discharging equipment, characterized in that the trough is divided into two mutually separated regions, the first region taking up and buffering the residual concrete and the second region functioning as a washing-out trough, further including a second conveying mechanism, which transports material from the first region into the second region.

2. The apparatus of claim 1, wherein the discharging equipment is constructed as combined discharging and screening equipment.

3. The apparatus of claim 2, wherein the discharging and screening equipment has a conveying trough, which acts together with a conveying spiral, the conveying trough being constructed as a screen.

4. The apparatus of claim 3, further comprising an adjusting mechanism proximal to the conveying spiral (103,107) and, by means of the adjusting screws (135), makes it possible to shift the conveying spiral relative to the conveying trough.

5. The apparatus of claim 3, wherein the conveying trough is mounted elastically by means of springs and in that a shaking mechanism is provided, which oscillates the conveying trough.

6. The apparatus of claim 2, wherein the screening equipment, operating in the dry state, is proximal to the discharging equipment.

7. The apparatus of claim 1 wherein the first and second regions are separated from one another by means of a separating partition.

8. The apparatus of claim 7, wherein the separating partition has a transfer chute, on which the second conveying mechanism transports material, the transfer chute being inclined so that the material reaches the second region.

9. The apparatus of claim 8, wherein the second conveying mechanism comprises a conveying spiral and a bucket wheel.

10. The apparatus of claim 9, wherein the bucket wheel has closed drag buckets.

11. The apparatus of claim 7, further comprising a charging funnel that ends in the first region, the charging funnel having an upper edge which is offset from the upper edge of the separating partition.

12. The apparatus of claim 1, wherein the discharging equipment has a screw conveyor, which is enveloped at least semi-circularly by a conveying trough.

13. The apparatus of claim 12, wherein the screw conveyor is disposed so that it can be shifted in the radial direction with respect to the conveying trough.

14. The apparatus of claim 12, wherein the conveying trough is made from an elastic material.

15. The apparatus of claim 12, wherein the screw conveyor, at least at one longitudinal end, is mounted on a plate having elongated holes, which act together with adjusting screws disposed at, a housing accommodating the screw conveyor.

* * * * *